(12) United States Patent
Hong et al.

(10) Patent No.: US 10,268,675 B2
(45) Date of Patent: Apr. 23, 2019

(54) VEHICLE AND CONTROL METHOD FOR THE VEHICLE

(71) Applicant: HYUNDAI MOTOR COMPANY, Seoul (KR)

(72) Inventors: Gi Beom Hong, Bucheon-si (KR); Jungsang Min, Seoul (KR); Jeong-Eom Lee, Yongin-si (KR); Sihyun Joo, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 513 days.

(21) Appl. No.: 14/939,034

(22) Filed: Nov. 12, 2015

(65) Prior Publication Data

US 2017/0004127 A1    Jan. 5, 2017

(30) Foreign Application Priority Data

Jul. 3, 2015    (KR) .......................... 10-2015-0095404

(51) Int. Cl.
*G06F 3/0488* (2013.01)
*G06F 3/0486* (2013.01)
(Continued)

(52) U.S. Cl.
CPC ............ *G06F 17/276* (2013.01); *G06F 3/048* (2013.01); *G06F 3/0482* (2013.01); *G06F 3/04842* (2013.01); *G06F 3/04883* (2013.01)

(58) Field of Classification Search
None
See application file for complete search history.

(56) References Cited

U.S. PATENT DOCUMENTS 7,443,316 B2 * 10/2008 Lim ...................... G06F 3/0237
345/168
2006/0095844 A1 * 5/2006 Van Leeuwen ....... G06F 3/0236
715/700

(Continued)

FOREIGN PATENT DOCUMENTS

EP        2677396 A2    12/2013
EP        2881878 A2    6/2015
(Continued)

OTHER PUBLICATIONS

Extended European Search Report issued in Application No. 16177496.3 dated Nov. 28, 2016.

*Primary Examiner* — Jeffrey A Gaffin
*Assistant Examiner* — Nhat Huy T Nguyen
(74) *Attorney, Agent, or Firm* — Morgan Lewis & Bockius LLP

(57) ABSTRACT

A vehicle includes a display unit for displaying a first character input User Interface (UI) in which a plurality of characters are arranged to surround a predetermined reference point, a touch input apparatus having a concave area for detecting a touch gesture of selecting one character of the plurality of characters, and a controller for controlling the display unit to display, wherein if the number of pre-stored completed character combinations corresponding to an input character combination configured with at least one character sequentially selected according to the touch gesture detected by the touch input apparatus is smaller than or equal to a threshold value, a second character input UI in which the completed character combinations corresponding to the input character combination are arranged to surround the reference point.

19 Claims, 18 Drawing Sheets

(51) Int. Cl.
*G06F 3/0484*     (2013.01)
*G06F 17/27*      (2006.01)
*G06F 3/048*      (2013.01)
*G06F 3/0482*     (2013.01)

(56) References Cited

U.S. PATENT DOCUMENTS

| | | | |
|---|---|---|---|
| 2006/0279554 A1* | 12/2006 | Shin | G06F 3/03547 |
| | | | 345/173 |
| 2008/0059913 A1* | 3/2008 | Burtner | G06F 3/0482 |
| | | | 715/854 |
| 2013/0024071 A1 | 1/2013 | Sivertsen | |
| 2014/0351740 A1 | 11/2014 | Li et al. | |
| 2015/0040056 A1* | 2/2015 | Cho | G06F 3/018 |
| | | | 715/773 |

FOREIGN PATENT DOCUMENTS

| | | |
|---|---|---|
| JP | 2008-026439 A | 2/2008 |
| JP | 2009-250840 A | 10/2009 |
| JP | 2011-141725 A | 7/2011 |
| JP | 2013-003802 A | 1/2013 |
| JP | 2013-097513 A | 5/2013 |
| KR | 10-2007-0050318 A | 5/2007 |
| KR | 10-2008-0033739 A | 4/2008 |

\* cited by examiner

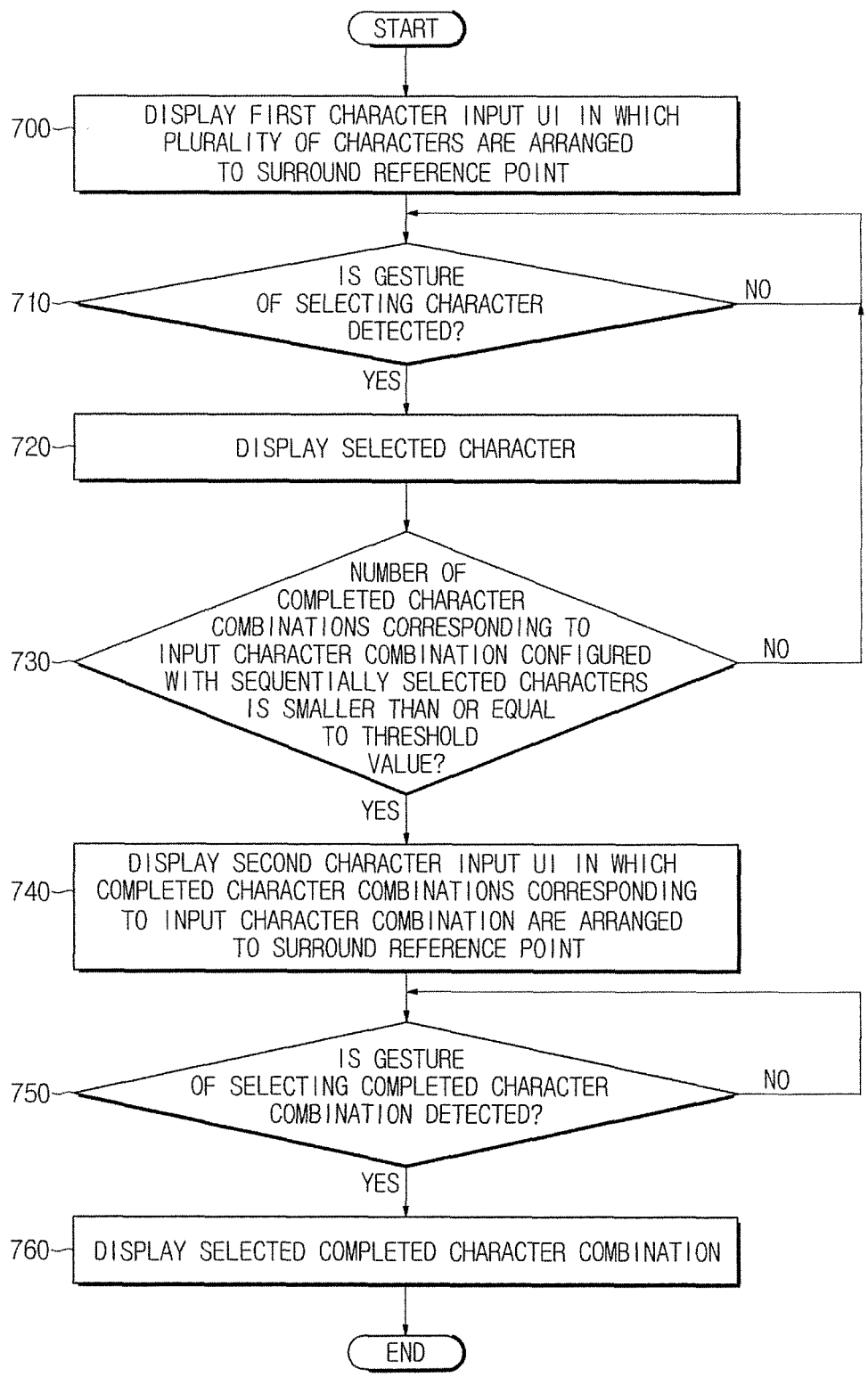

VEHICLE AND CONTROL METHOD FOR THE VEHICLE

CROSS-REFERENCE TO RELATED APPLICATION

This application claims the benefit of priority to Korean Patent Application No. 10-2015-0095404, filed on Jul. 3, 2015 with the Korean Intellectual Property Office, the disclosure of which is incorporated herein by reference.

TECHNICAL FIELD

Embodiments of the present disclosure relate to a vehicle including a touch input apparatus having a concave area, and to a method of controlling the vehicle.

BACKGROUND

Vehicles often have various functions for improving a passenger's convenience, in addition to driving functions. However, the more functions a vehicle has, the more operating load a driver experiences. Excessive operating load deteriorates a driver's concentration on driving. Also, as a vehicle has more functions, a driver's difficulties in operating the vehicle might increase accordingly, such that a driver might be not able to properly use all functions the vehicle can perform.

In order to overcome the problem, studies into a vehicle-mounted input device for reducing a driver's operating load and difficulties have been conducted. A representative example of such a vehicle-mounted input device is a touch input device capable of detecting a driver's touch inputs. If a vehicle has such a touch input device, a driver would be able to easily control the vehicle by touching the touch input device without having to perform any complicated manipulations.

SUMMARY OF THE DISCLOSURE

Therefore, it is an aspect of the present disclosure to provide a vehicle capable of displaying a character input User Interface (UI) to show pre-stored completed character combinations corresponding to an input character combination, and a method of controlling the vehicle.

Additional aspects of the disclosure will be set forth in part in the description which follows and, in part, will be obvious from the description, or may be learned by practice of the disclosure.

In accordance with one aspect of the present disclosure, a vehicle includes: a display unit for displaying a first character input User Interface (UI) in which a plurality of characters are arranged to surround a predetermined reference point; a touch input apparatus having a concave area for detecting a touch gesture of selecting one character of the plurality of characters; and a controller for controlling the display unit to display, if the number of pre-stored completed character combinations corresponding to an input character combination configured with at least one character sequentially selected according to the touch gesture detected by the touch input apparatus is smaller than or equal to a threshold value, a second character input UI in which the completed character combinations corresponding to the input character combination are arranged to surround the reference point.

The touch input apparatus may detect a touch gesture of selecting a completed character combination from among the arranged completed character combinations.

The controller may control the display unit to inform that the selected completed character combination was selected.

The touch input apparatus may include a concave area divided into a first area and a second area, wherein the second area may correspond to the central part of the concave area and has a circular shape, and the first area may surround the circumference of the second area.

If a gesture of moving a touch location from the first area to the second area is detected, the controller may control the display unit to inform that a character or a completed character combination corresponding to the touch location of the first area was selected.

If the gesture of moving a touch location from the first area to the second area is detected, and successively a gesture of moving the touch location to the first area is detected, the controller may control the display unit to inform that the selection of the selected character or the selected completed character combination was cancelled.

If the number of completed character combinations including the entirety of the input character combination is smaller than or equal to the threshold value, the controller may control the display unit to display the second character input UI.

If the number of completed character combinations including at least one character of characters configuring the input character combination is smaller than or equal to the threshold value, the controller may control the display unit to display the second character input UI.

The controller may control the display unit to display a second character input UI in which the completed character combinations corresponding to the input character combination are adjusted to have a predetermined length.

The controller may reduce the sizes of the completed character combinations so that the completed character combinations have the predetermined length.

The controller may omit at least one character of characters configuring each completed character combination so that the completed character combinations have the predetermined length.

In accordance with another aspect of the present disclosure, a method of controlling a vehicle, the vehicle including a touch input apparatus having a concave area configured to detect a touch gesture, includes: displaying a first character input User Interface (UI) in which a plurality of characters are arranged to surround a predetermined reference point; detecting a touch gesture of selecting a character of the plurality of characters; and displaying, if the number of pre-stored completed character combinations corresponding to an input character combination configured with at least one character sequentially selected according to the touch gesture detected by the touch input apparatus is smaller than or equal to a threshold value, a second character input UI in which the completed character combinations corresponding to the input character combination are arranged to surround the reference point.

The method may further include: detecting a touch gesture of selecting a completed character combination from among the arranged completed character combinations; and informing that the selected completed character combination was selected.

The method may further include dividing a concave area into a first area and a second area, wherein the second area may correspond to the central part of the concave area and has a circular shape, and the first area may surround the circumference of the second area.

The method may further include, if a gesture of moving a touch location from the first area to the second area is detected when the first character input UI is displayed, informing that a character corresponding to the touch location of the first area was selected.

The method may further include, if the gesture of moving the touch location from the first area to the second area is detected, and successively a gesture of moving the touch location to the first area is detected, informing that the selection of the selected character was cancelled.

The method may further include, if a gesture of moving a touch location from the first area to the second area is detected when the second character input UI is displayed, informing that a completed character combination corresponding to the touch location of the first area was selected.

The method may further include, if the gesture of moving the touch location from the first area to the second area is detected, and successively a gesture of moving the touch location to the first area is detected, informing that the selection of the selected completed character combination was cancelled.

The displaying of the second character input UI may include displaying the second character input UI, if the number of completed character combinations including the entirety of the input character combination is smaller than or equal to the threshold value.

The displaying of the second character input UI may include displaying the second character input UI, if the number of completed character combinations including at least one character of characters configuring the input character combination is smaller than or equal to the threshold value.

The displaying of the second character input UI may include displaying a second character input UI in which the completed character combinations corresponding to the input character combination are adjusted to have a predetermined length.

The displaying of the second character input UI may include reducing the sizes of the completed character combinations so that the completed character combinations have the predetermined length.

The displaying of the second character input UI may include omitting at least one character of characters configuring each completed character combination so that the completed character combinations have the predetermined length.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 11 is a flowchart illustrating a vehicle control method according to an embodiment of the present disclosure.

DETAILED DESCRIPTION

Figure 1:
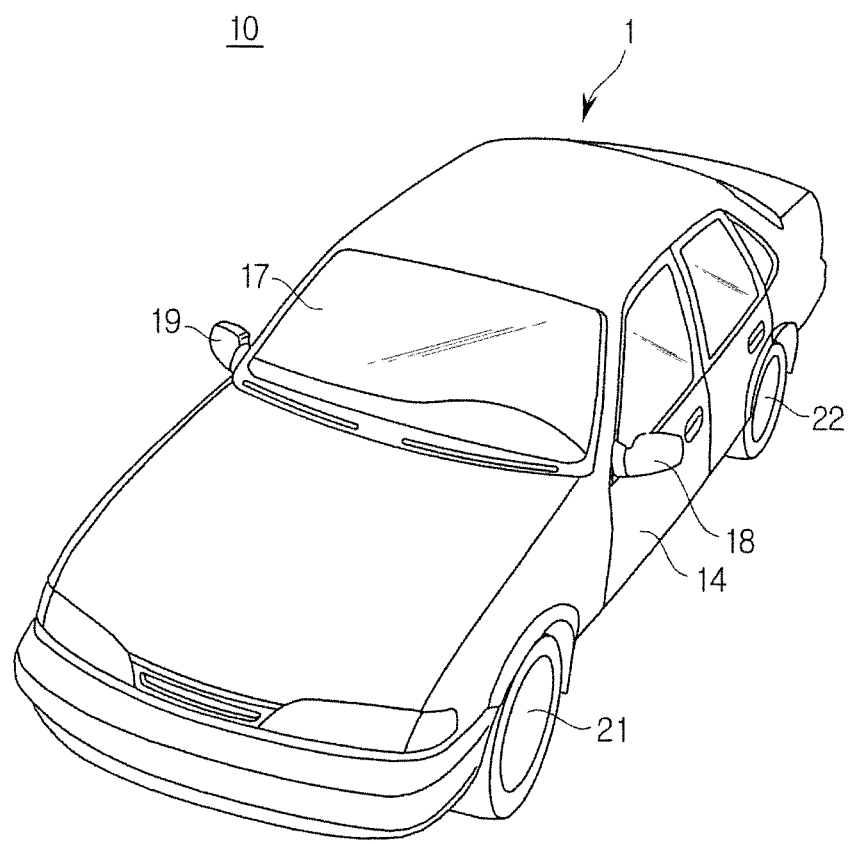
FIG. 1 shows an outer appearance of a vehicle according to an embodiment of the present disclosure.

Reference will now be made in detail to the embodiments of the present disclosure, examples of which are illustrated in the accompanying drawings, wherein like reference numerals refer to like elements throughout.

Hereinafter, a vehicle, and a control method thereof will be described in detail, with reference to the accompanying drawings.

FIG. 1 shows an outer appearance of a vehicle according to an embodiment of the present disclosure.

As shown in FIG. 1, a vehicle 1 according to an embodiment of the present disclosure may include a main body 10 forming an outer appearance of the vehicle 1, wheels 21 and 22 to move the vehicle 1, doors 14 to shield the interior of the vehicle 1 from the outside, a front glass 17 to provide a driver inside the vehicle 1 with a front view of the vehicle 1, and side-view mirrors 18 and 19 to provide the driver with rear and side views of the vehicle 1.

The wheels 21 and 22 may include front wheels 21 provided in the front part of the vehicle 1, and rear wheels 22 provided in the rear part of the vehicle 1. The front wheels 21 or the rear wheels 22 may receive rotatory power from a driving apparatus which will be described later to move the main body 10 forward or backward.

The doors 14 may be rotatably provided in the left and right sides of the main body 10 to allow the driver to open one of them and get into the vehicle 1. Also, the doors 14 may shield the interior of the vehicle 10 from the outside when all of them are closed.

The front glass 17 may be provided in the upper, front part of the main body 10 to provide the driver inside the vehicle 1 with a front view of the vehicle 1. The front glass 17 is also called windshield glass.

The side-view mirrors 18 and 19 may include a left side-view mirror 18 provided in the left side of the main body 10, and a right side-view mirror 19 provided in the right side of the main body 10 to provide the driver inside the vehicle 1 with rear and side views of the vehicle 10.

Figure 2:
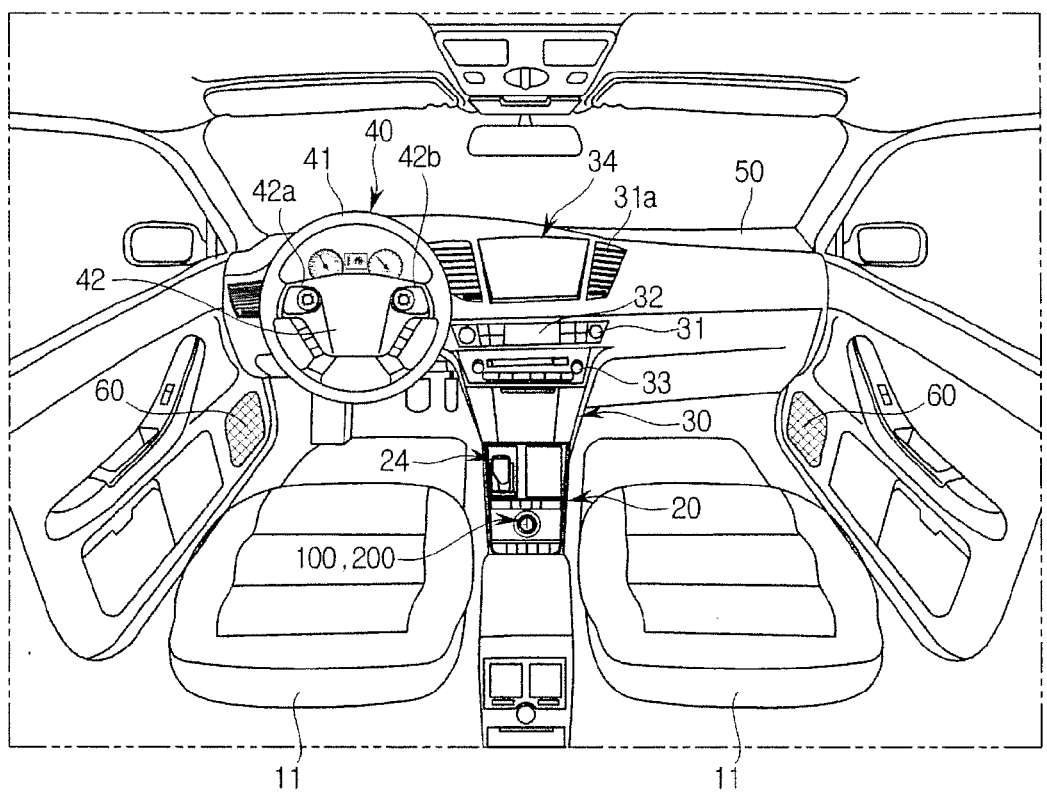
FIG. 2 shows an interior of a vehicle according to an embodiment of the present disclosure.

FIG. 2 shows an interior of the vehicle 1 according to an embodiment of the present disclosure.

Referring to FIG. 2, the vehicle 1 may include: a plurality of seats 11 in which a driver and a passenger sit; a dashboard 50 on which a gear box 20, a center fascia 30, and a steering wheel 40 are provided; and a plurality of speakers 60.

The gear box 20 may include a transmission lever 24 for shifting gears, and a touch input apparatus 100 or 200 for controlling function execution of the vehicle 1. The touch input apparatus 100 or 200 will later be described in detail.

The steering wheel 40 attached on the dashboard 50 may be used to change a driving direction of the vehicle 1. The steering wheel 40 may include a rim 41 that can be gripped by a driver, and a spoke 42 connected to a steering apparatus of the vehicle 1 and connecting the rim 31 to a hub of a rotation axis for steering. According to an embodiment, the spoke 42 may include a plurality of manipulation units 42a and 42b for controlling various devices (for example, an audio system) of the vehicle 1.

In the center fascia 30 provided on the dashboard 50, an air conditioner 31, a clock 32, an audio system 33, a display, etc. may be installed.

The air conditioner 31 may adjust the temperature, humidity, air quality, and flow of air inside the vehicle 1 to maintain a pleasant environment inside of the vehicle 1. The air conditioner 31 may be installed in the center fascia 30, and may include at least one vent 31a for discharging air. In the center fascia 30, at least one button or dial for controlling the air conditioner 31, etc. may be provided. A driver or passenger may use the button provided on the center fascia 30 to control the air conditioner 31.

The clock 32 may be positioned around the button or dial for controlling the air conditioner 31.

The audio system 33 may include an operating panel on which a plurality of buttons for executing functions of the audio system 33 are arranged. The audio system 33 may provide a radio mode to provide a radio function, and a media mode to reproduce an audio file stored in storage medium that stores audio files.

The display unit 34 may display a User Interface (UI) to provide a driver with information related to the vehicle 1 in the form of an image or text. The display unit 34 may be embedded in the center fascia 30. However, the display unit 34 may be installed in another fashion. For example, the display unit 34 may be separated from the center fascia 30 of the vehicle 1. Details about operations of the display unit 34 will be described later.

The display unit 34 may be a Liquid Crystal Display (LCD), a Light Emitting Diode (LED) display, a Plasma Display Panel (PDP) display, an Organic Light Emitting Diode (OLED) display, or a Cathode Ray Tube (CRT) display, although the display unit 34 is not limited to these.

Also, the dashboard 50 may further include an instrument panel to display speed, Revolutions Per Minute (RPM), and a fuel gauge of the vehicle 1, and a globe box to store various things.

In the inside of the vehicle 1, the speakers 60 may be provided to output sound. The speakers 60 may output information related to the vehicle 1 in the form of sound. For example, if the vehicle 1 receives an output signal for controlling outputting of a recommended driving method, the speakers 60 may output the recommended driving method corresponding to the output signal in the form of sound for a driver.

Meanwhile, the vehicle 1 may provide the driver with a character input UI through the display unit 34, so that the driver or a passenger can input a character through the touch input apparatus 100 or 200. Hereinafter, a method of manipulating the character input UI of the vehicle 1, according to an embodiment of the present disclosure, will be described with reference to FIG. 3.

Figure 3:
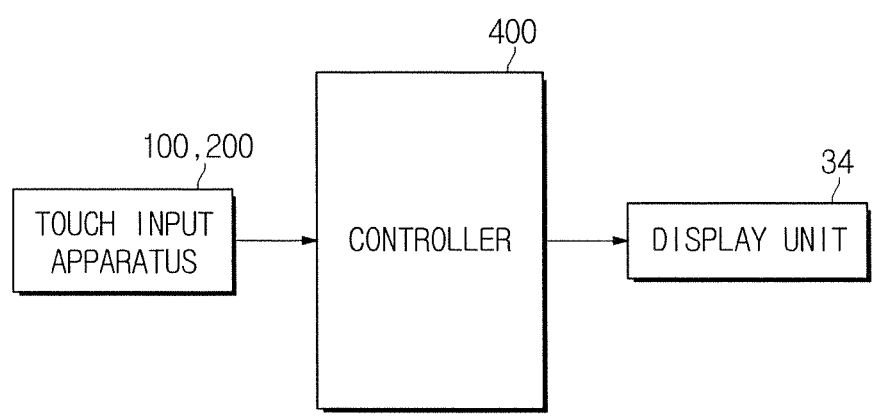
FIG. 3 is a control block diagram of a vehicle according to an embodiment of the present disclosure.

FIG. 3 is a control block diagram of the vehicle 1 according to an embodiment of the present disclosure.

In order to manipulate the character input UI, the vehicle 1 may include: the touch input apparatus 100 or 200 to detect a touch gesture; the display unit 34 to display the character input UI; storage to store a control command corresponding to the touch gesture; and a controller 400 to control the display unit 34 to manipulate a character input UI that is displayed according to the touch gesture.

The control command corresponding to the touch gesture detected by the touch input apparatus 100 or 200 may have been stored in advance in the storage. The storage may provide the control command to the controller 400 which will be described later.

Also, the storage may have already stored completed character combinations, and information corresponding to the completed character combinations. Examples of the information corresponding to the completed character combinations stored in the storage may include phone numbers, addresses, music, and video.

The display unit 34 may receive the control command from the controller 400, and inform that a character selected by a passenger was selected, through the character input UI. For the operation, in the character input UI displayed on the display unit 34, a plurality of characters may be arranged in the form of a circle or oval. Hereinafter, an embodiment of a first character input UI that is displayed on the display unit 34 will be described with reference to FIG. 4.

Figure 4:
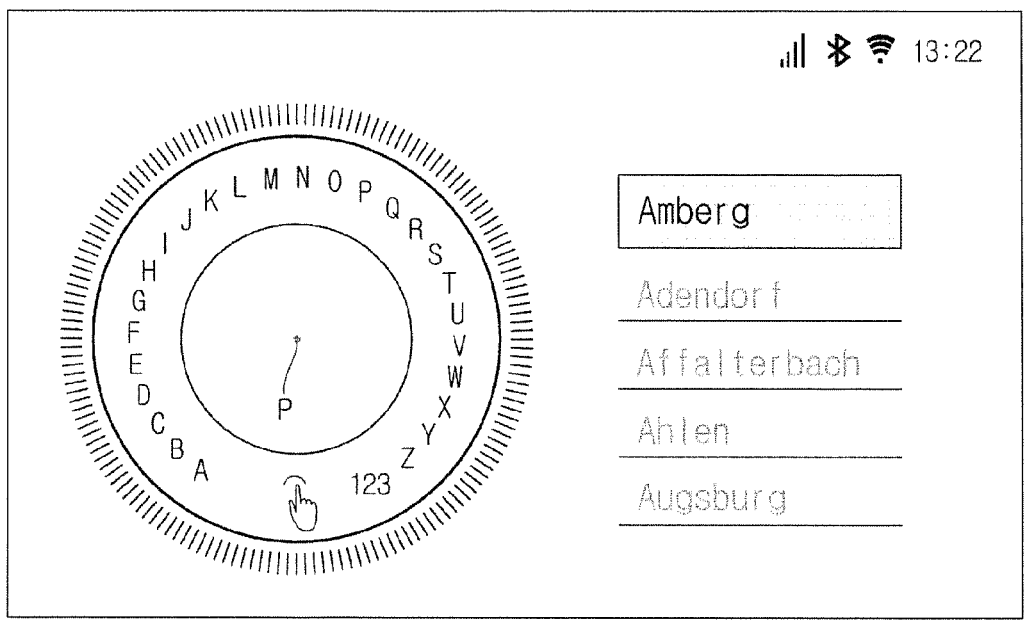
FIG. 4 shows an embodiment of a first character input User Interface (UI) displayed on a display unit.

FIG. 4 shows an embodiment of a first character input UI displayed on the display unit 34.

In order to allow a passenger to select a character through the touch input apparatus 100 or 200, the display unit 34 may display a first character input UI in which a plurality of characters are arranged to surround a predetermined reference point P. The characters arranged in the first character input UI may include at least one of consonants, vowels, and special characters of a predetermined language.

Referring to FIG. 4, the characters arranged to surround the predetermined reference point P may be displayed in the left area of the first character input UI. The first character input UI may display characters selected by the passenger in a box located in the upper, right area, sequentially in the order in which they are selected, and also display completed character combinations that are recommended for the passenger, below the box.

The completed character combinations that are recommended for the passenger may be completed character combinations corresponding to an input character combination configured with the characters sequentially input by the passenger among a plurality of completed character combinations stored in the storage. For example, the first character input UI may recommend completed character combinations including the entirety of the input character combination, or completed character combinations including at least one character of the plurality of characters configuring the input character combination.

However, the first character input UI shown in FIG. 4 is an embodiment of a first character input UI, and the first character input UI can be configured in any other format within a technical concept of arranging a plurality of characters to surround a predetermined reference point P.

Referring again to FIG. 3, the touch input apparatus 100 or 200 may detect a touch operation by a passenger including a driver. In order to detect a passenger's touch operation, the touch input apparatus 100 or 200 may have a concave area capable of detecting a touch operation.

Hereinafter, various embodiments of the touch input apparatus 100 or 200 will be described with reference to FIGS. 5A to 5C and 6A to 6C.

Figure 5A:
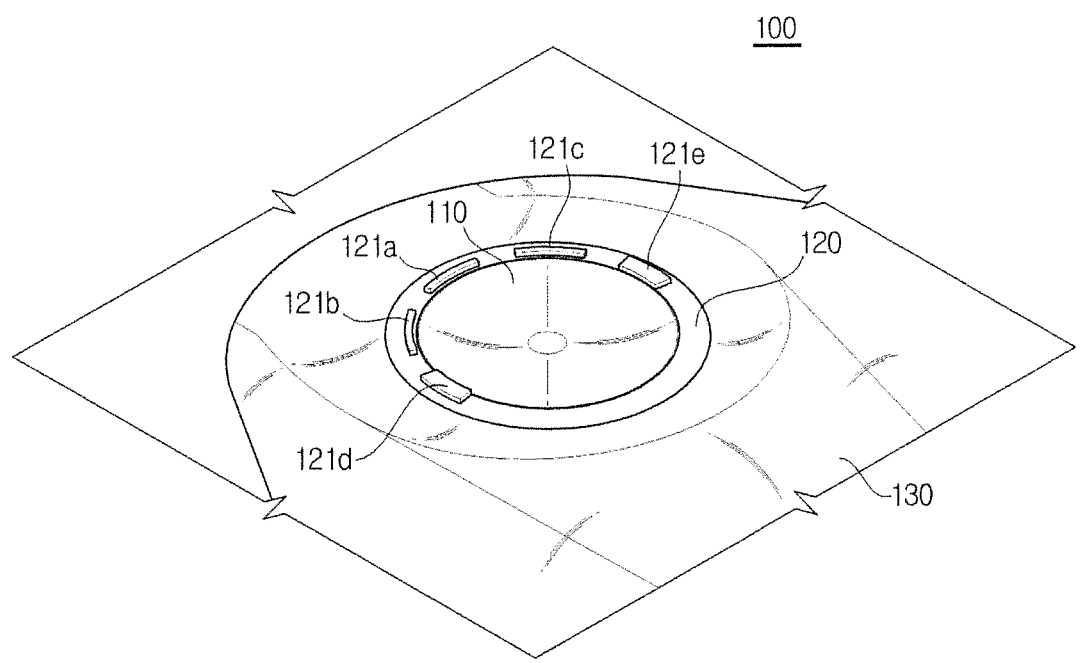
FIG. 5A is a perspective view of a touch input apparatus according to an embodiment of the present disclosure.
Figure 5B:
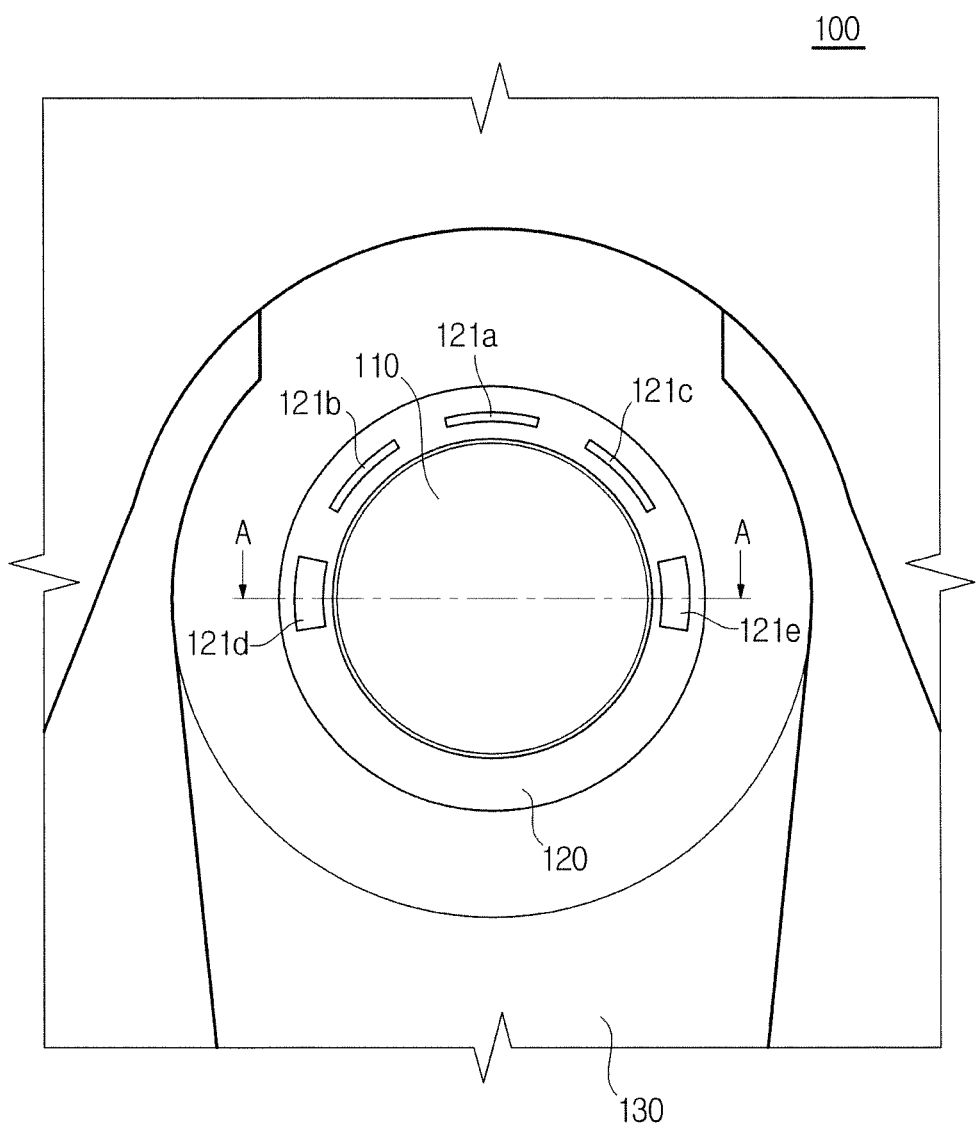
FIG. 5B is a plan view of the touch input apparatus of FIG. 5A.
Figure 5C:
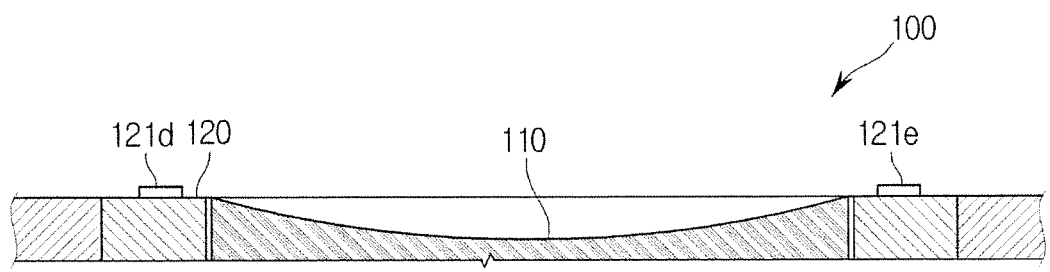
FIG. 5C is a cross-sectional view of the touch input apparatus cut along a line A-A of FIG. 5B.

FIG. 5A is a perspective view of the touch input apparatus 100 according to an embodiment of the present disclosure, FIG. 5B is a plan view of the touch input apparatus 100 of FIG. 5A, and FIG. 5C is a cross-sectional view of the touch input apparatus 100 cut along a line A-A of FIG. 5B.

The touch input apparatus 100 shown in FIGS. 5A to 5C may include a touch section 110 to detect a passenger's touch operation, and a border section 120 located along the circumference of the touch section 110.

The touch section 110 may be a touch pad to generate a signal when a passenger contacts or approaches it using a pointer, such as his/her finger or a touch pen. The passenger may make a predetermined touch gesture on the touch section 110 to input a desired control command.

The touch pad may be a touch film or a touch sheet including a touch sensor, regardless of its name. Also, the touch pad may be a touch panel which is a display unit capable of detecting a touch operation on a screen.

Meanwhile, a touch operation of making a pointer approach a touch pad so as for the pointer to be at the proximity of the touch pad without being in contact with the touch pad in order to recognize the location of the pointer is called "proximity touch", and a touch operation of making a pointer contact a touch pad in order to recognize the location of the pointer is called "contact touch". The location of a pointer at which proximity touch is recognized may be a location at which the pointer approaches a touch pad to be vertical to the touch pad.

The touch pad may be a resistive type touch pad, an optical type touch pad, a capacitive type touch pad, an ultrasonic type touch pad, or a pressure type touch pad. That is, the touch pad may be one of various kinds of touch pads well-known in the art.

The border section 120 surrounding the touch section 110 may be provided as a separate member from the touch section 110. In the border section 120, one or more key buttons or touch buttons 121 may be arranged. Accordingly, the passenger may input a control command by touching the touch section 110 or using the buttons 121 arranged in the border section 120 around the touch section 110.

The touch input apparatus 100 may further include a wrist supporting part 130 to support the passenger's wrist. The wrist supporting part 130 may be positioned higher than the touch section 110. Since the wrist supporting part 130 is positioned higher than the touch section 110, the wrist supporting part 130 may prevent a passenger's wrist from being bent when he/she touches the touch section 110 with his/her finger while putting his/her wrist on the wrist supporting part 130. Accordingly, the wrist supporting part 130 may protect the passenger from musculoskeletal system disorder, while offering a good operation feeling.

The touch section 110 may include an area that is lower than the boundary line with the border section 120. That is, the touch surface of the touch section 110 may be lower than the boundary line with the border section 120. For example, the touch surface of the touch section 110 may be inclined downward from the boundary line with the border section 120, or the touch surface of the touch section 110 may have a step with respect to the boundary line with the border section 120. For example, as shown in FIGS. 5A to 5C, the touch section 110 may include a concave, curved area.

Since the touch section 110 includes an area lower than the boundary line with the border section 120, the passenger can recognize the area of the touch section 110 and the boundary line with his/her tactile impression. In the touch input apparatus 100, the center area of the touch section 110 may have a high detection rate with respect to touch operations. Also, when the passenger inputs a touch operation, the passenger can intuitively recognize the touch area and the boundary line so that he/she can apply a touch operation to an exact location, resulting in an improvement in accuracy of touch inputs.

The touch section 110 may include a concave area, as described above. Herein, the term "concave" means a hollow or depressed shape, and may also include an inclined or stepped shape, as well as a round depressed shape.

Referring to FIG. 5C, the touch section 110 may include a concave, curved area. In this case, the concave, curved surface of the touch section 110 may have different curvatures according to area. For example, the center area of the concave, curved surface may have a relatively small curvature (a small radius of curvature), and the outer area of the concave, curved surface may have a relatively great curvature (a greater radius of curvature).

Since the touch section 110 includes a curved surface, the passenger can feel improved touch sensation when applying a touch input to the touch section 110. The curved surface of the touch section 110 may similarly correspond to a trajectory drawn by a user fingertip's movement occurring when he/she moves his/her finger while fixing his/her wrist or when he/she rotates or twists his/her wrist while spreading out his/her fingers.

Also, the touch section 110 may have a circular shape. If the touch section 110 has a circular shape, it may be easy to form a concave, curved area in the touch section 110. Also, if the touch section 110 has a circular shape, the passenger can easily recognize the touch area of the touch section 100 with his/her tactile feeling so as to easily input rolling or spin operations.

Also, since the touch section 110 is curved, the passenger can intuitively recognize at which location of the touch section 110 his/her finger is positioned. Also, if the touch section 110 is curved, all points of the touch section 110 may have different gradients. Accordingly, the passenger can intuitively recognize which location of the touch section 110 his/her finger touches through a sense of gradient felt by the finger. That is, the curved shape of the touch section 110 can provide the passenger with feedback about which location of the touch section 110 his/her finger is located when he/she makes a gesture on the touch section 110 while fixing his/her eyes at some other place instead of the touch section 110, thereby helping the passenger make his/her desired gesture and improving the accuracy of gesture inputs.

However, unlike the embodiment shown in FIGS. 5A to 5C, the concave area of the touch input apparatus may be divided into two areas of a center area and an outer area. Hereinafter, a case in which the concave area of the touch input apparatus is divided into a gesture input section corresponding to the center portion of the concave area and a swiping input section corresponding to the outer portion of the concave area will be described in detail with reference to FIGS. 6A, 6B, and 6C.

Figure 6A:
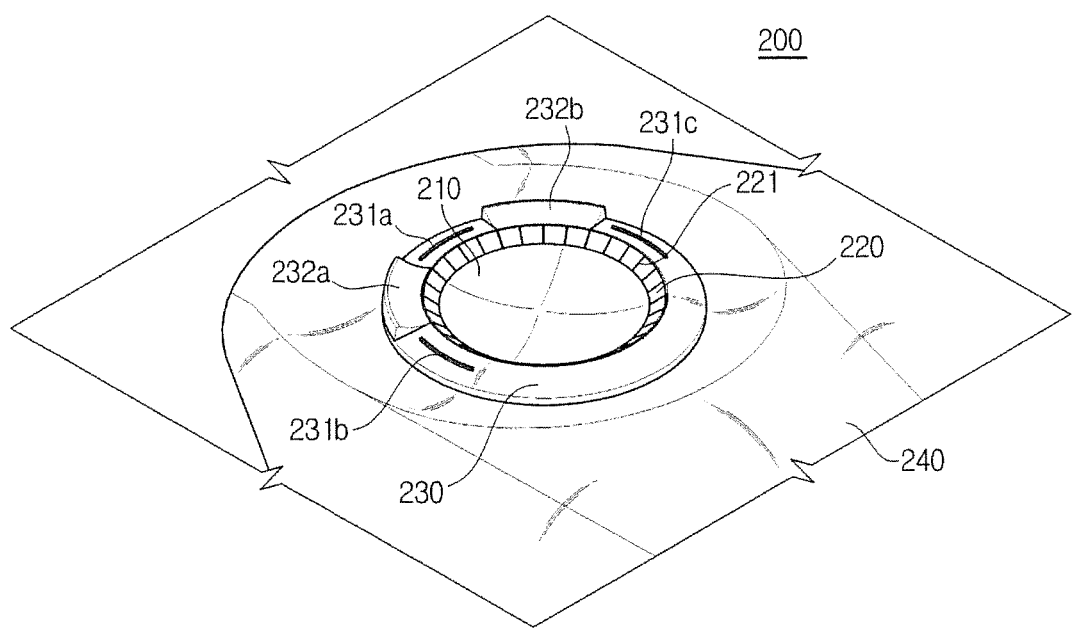
FIG. 6A is a perspective view of a touch input apparatus according to another embodiment of the present disclosure.
Figure 6B:
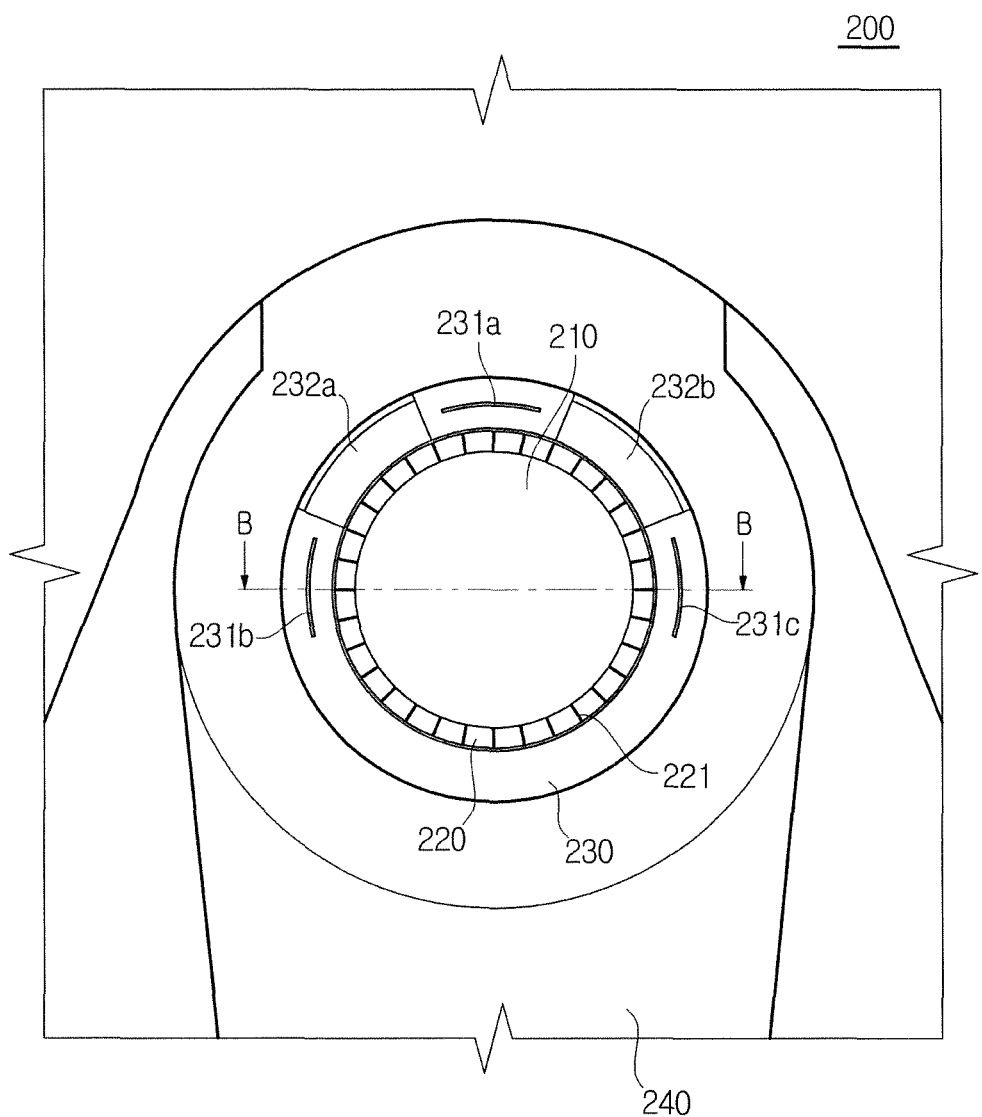
FIG. 6B is a plan view of the touch input apparatus of FIG. 6A.
Figure 6C:
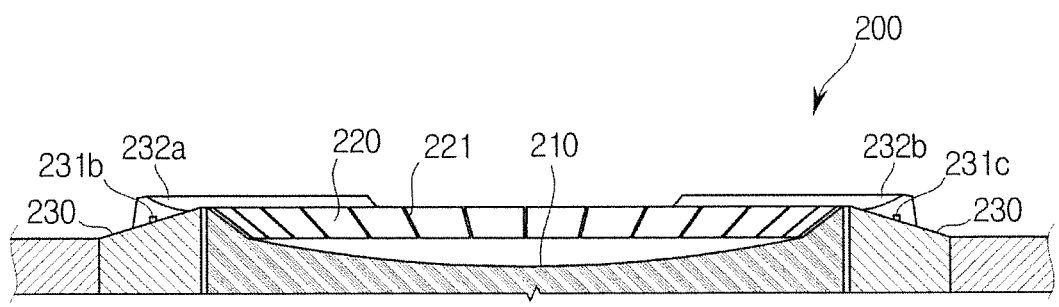
FIG. 6C is a cross-sectional view of the touch input apparatus cut along a line B-B of FIG. 6B.

FIG. 6A is a perspective view of a touch input apparatus according to another embodiment of the present disclosure, FIG. 6B is a plan view of the touch input apparatus of FIG. 6A, and FIG. 6C is a cross-sectional view of the touch input apparatus cut along a line B-B of FIG. 6B.

Referring to FIGS. 6A, 6B, and 6C, a touch input apparatus 200 may include touch sections 210 and 220 to detect a passenger's touch input, and a border section 230 surrounding the touch sections 210 and 220.

A method in which the touch sections 210 and 220 detect a touch input is the same as the method described above in the embodiment of FIGS. 5A to 5C.

The border section 230 surrounding the touch sections 210 and 220 may be provided as a separate member from the touch sections 210 and 220. In the border section 230, one or more key buttons 232a and 232b or one or more touch buttons 231a, 231b, and 231c may be arranged in such a way to surround the touch sections 210 and 220. The passenger may make a gesture on the touch sections 210 and 220, or may input a signal using any one of the buttons 231a, 231b, 232a, 232b, and 232c arranged in the border section 230 around the touch sections 210 and 220.

Also, as shown in FIGS. 6A to 6C, the touch input apparatus 200 may further include a wrist supporting part 240 located in the lower portion and supporting the passenger's wrist.

Referring to FIG. 6C, the touch sections 210 and 220 may include an area that is lower than the boundary line with the border section 230. That is, the touch surfaces of the touch sections 210 and 220 may be lower than the boundary line with the border section 230. For example, the touch surfaces of the touch sections 210 and 220 may be inclined downward from the boundary line with the border section 230, or the touch surfaces of the touch sections 210 and 220 may have a step with respect to the boundary line with the border section 230. For example, as shown in FIG. 6C, the touch sections 210 and 220 may include a gesture input section 210 that is a concave, curved area.

The shape of the touch sections 210 and 220 having a concave area is the same as that of the touch section 110 described in the embodiment of FIGS. 5A to 5C.

The touch sections 210 and 220 according to the other embodiment of the present disclosure may include a swiping input section 220 inclined downward along the circumference of the gesture input section 210. If the touch sections 210 and 220 have a circular shape, the gesture input section 210 may be a part of a spherical surface, and the swiping input section 220 may surround the circumference of the gesture input section 210.

The swiping input section 220 may detect a swiping gesture. For example, the passenger may make a swiping gesture along the swiping input section 220 provided in the form of a circle. At this time, the passenger may make the swiping gesture clockwise or counterclockwise along the swiping input section 220.

The swiping input unit 220 may include gradations 221. The gradations 221 may visually or tactilely inform a passenger of a relative location. For example, the gradations 221 may be embossed or engraved. The gradations 221 may be arranged at regular intervals. Accordingly, the passenger can intuitively recognize the number of gradations through which his/her finger passes while making a swiping operation so as to accurately adjust a duration of the swiping gesture.

According to an embodiment, a cursor that is displayed on the display unit 34 (see FIG. 2) may move according to the number of gradations 221 through which a finger passes when a swiping gesture is made. If the passenger makes a swiping gesture when various selected characters were successively displayed on the display unit 34, a selected character may move to the right by a space whenever the passenger's finger passes through a gradation 221.

A gradient of the swiping input section 220 shown in FIGS. 6A, 6B, and 6C may be greater than a gradient in the direction of tangent of the swiping input section 220 with respect to the boundary line between the swiping input section 220 and the gesture input section 210. Since the swiping input unit 220 is more steeply inclined than the gesture input section 210, the passenger may intuitively recognize the gesture input section 210 when making a gesture on the gesture input section 210. Meanwhile, while a gesture is made on the gesture input section 210, no touch input applied on the swiping input section 220 may be recognized. Accordingly, when the passenger makes a gesture on the gesture input section 210 until reaching the boundary line with the swiping input section 220, the gesture input made on the gesture input section 210 may not overlap with any swiping gesture input made on the swiping input section 220.

Meanwhile, the swiping input section 220 may be integrated into the gesture input section 210. Also, a plurality of touch sensors may be respectively installed in the gesture input section 210 and the swiping input section 220, or a touch sensor may be installed in the gesture input section 210 and the swiping input section 220. If the gesture input section 210 and the swiping input section 220 include a touch sensor, the controller 400 may distinguish the touch area of the gesture input section 210 from the touch area of the swiping input section 220 to distinguish a signal generated in correspondence to a touch input applied on the gesture input section 210 from a signal generated in correspondence to a touch input applied on the swiping input section 220.

The touch input apparatus 200 may further include one or more buttons 231 and 232, as described above. The buttons 231 and 232 may be arranged around the touch sections 210 and 220. The buttons 231 and 232 may include one or more touch buttons 231a, 231b, and 231c to perform a predetermined function according to the passenger's touch input, and one or more pressure buttons 232a and 232b to change its position according to pressure applied by the passenger to perform a predetermined function.

Referring again to FIG. 3, the controller 400 may control the display unit 34 to inform that one of a plurality of characters included in the first character input UI being currently displayed was select, based on a touch input sensed by the concave area of the touch input apparatus 100 or 200.

Before controlling the display unit 34 to manipulate the first character input UI, the controller 400 may divide the concave area of the touch input apparatus 100 or 200.

Figure 7:
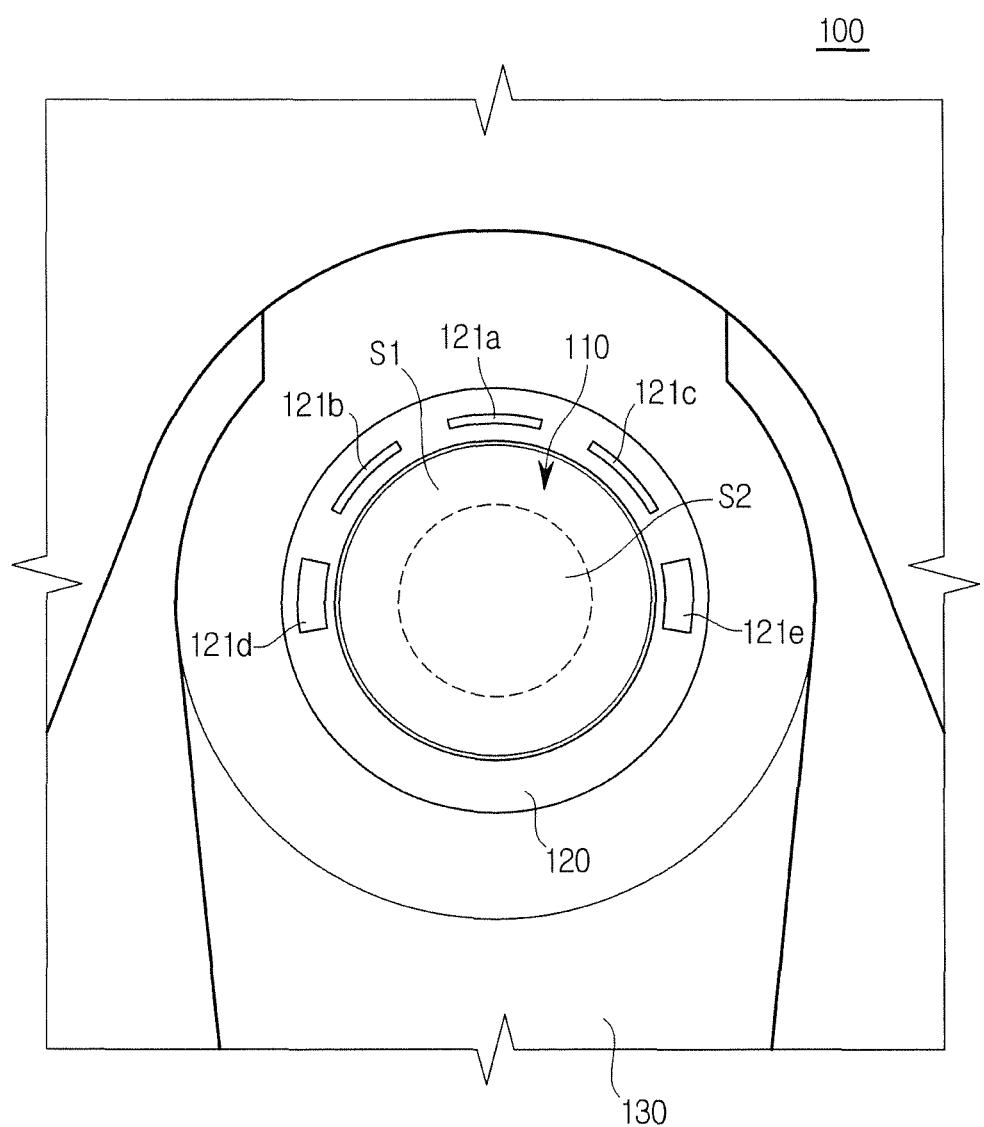
FIG. 7 shows a case in which a concave area of the touch input apparatus shown in FIGS. 5A to 5C is divided.

FIG. 7 shows a case in which a concave area of the touch input apparatus 100 shown in FIGS. 5A to 5C is divided.

In the touch input apparatus 100 shown in FIGS. 5A to 5C, the controller 400 may divide a touch section 110, which is a concave area, into a first area S1 and a second area S2, wherein the second area S2 corresponds to the central portion of the touch section 110 and has a circular shape, and the first area S1 surrounds the circumference of the second area S2.

However, in the touch input apparatus 200 shown in FIGS. 6A to 6C, the controller 400 may divide the concave area into a first area S1 and a second area S2 in a different way. More specifically, the controller 400 may set the swiping input section 220 to a first area S1 and the gesture input section 210 to a second area S2.

If the concave area of the touch input apparatus 100 or 200 is divided into the first area S1 and the second area S2, the controller 400 may control the display unit 34 to manipulate the first character input UI that is displayed according to a touch gesture detected through the touch input apparatus 100 or 200.

Hereinafter, an embodiment of a method in which the first character input UI that is displayed on the display unit 34 according to a touch gesture is manipulated will be described. For convenience of description, it is assumed that a touch gesture is made on the touch input apparatus 200 shown in FIGS. 6A to 6C.

Figure 8A:
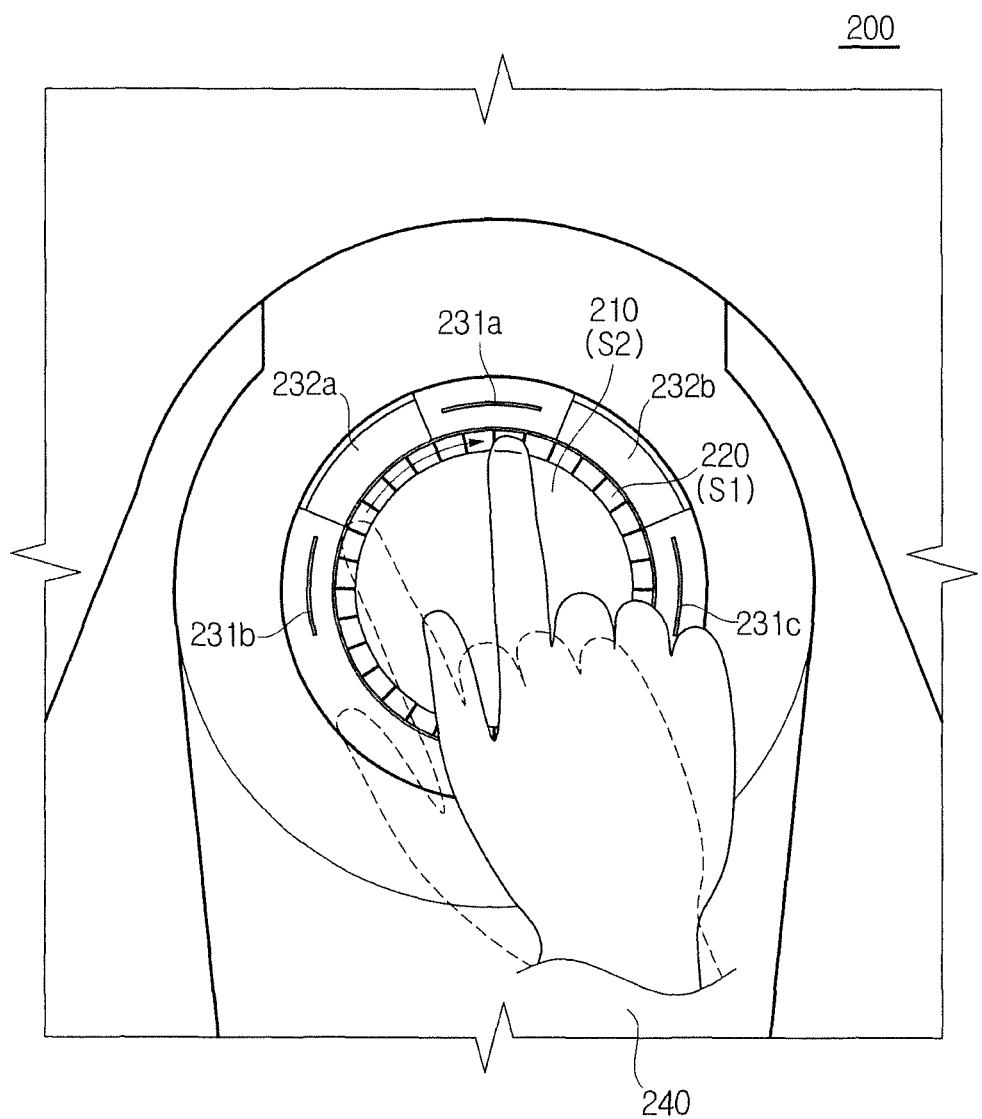
FIGS. 8A and 8B are views for describing a method of making a touch gesture for selecting a character on the touch input apparatus shown in FIGS. 6A to 6C.
Figure 8B:
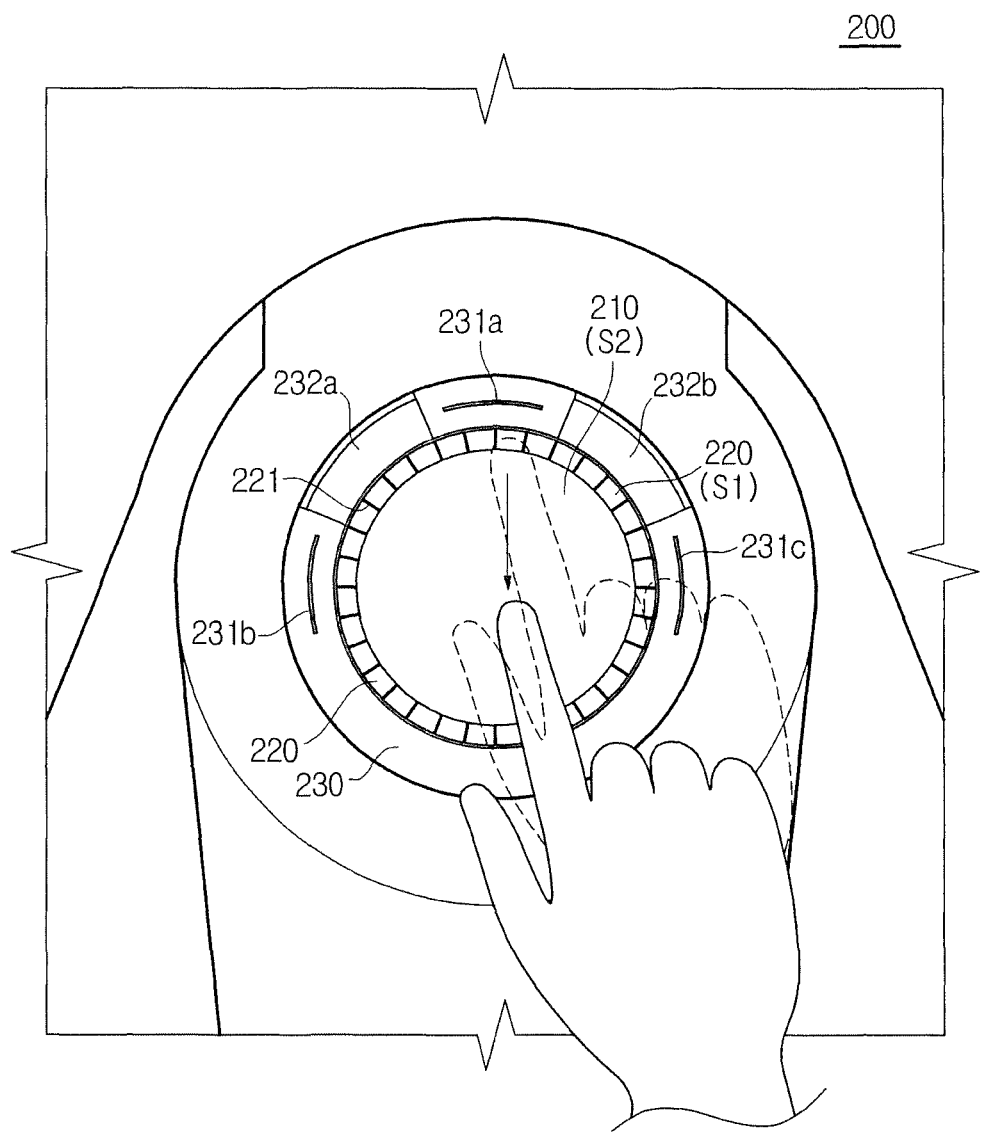

FIGS. 8A and 8B are views for describing a method of making a touch gesture for selecting a character on the touch input apparatus 200 shown in FIGS. 6A to 6C, and FIGS. 9A, 9B, and 9C are views for describing a method in which the controller 400 controls the first character input UI according to the touch gesture shown in FIGS. 8A and 8B.

Figure 9A:
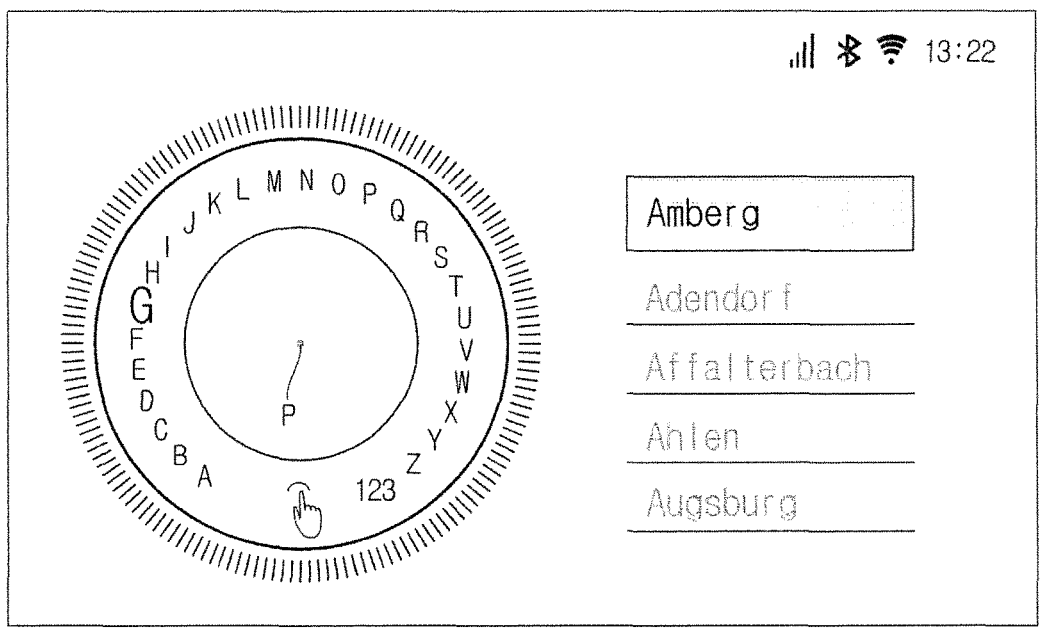
FIGS. 9A, 9B, and 9C are views for describing a method in which a controller controls a first character input UI according to the touch gesture shown in FIGS. 8A and 8B.

If the first character input UI as shown in FIG. 4 is displayed, a passenger may touch a second location which is an arbitrary location on the first area S1 including the swiping input section 220 of the touch input apparatus 200. Then, as shown in FIG. 9A, the controller 400 may control the display unit 34 to enlarge a character G corresponding to the second location rather than other characters. Thereby, the display unit 34 may inform that the character G can be selected.

As described above, the swiping input section 220 can recognize a swiping gesture, and the passenger may make a gesture of moving his/her finger clockwise or counterclockwise from the second location of the first area S1. In FIG. 8A, a case in which a gesture of moving a finger clockwise from the second location of the first areas S1 is made is shown.

If a swiping gesture is detected from the second location of the first area S1, the display unit 34 may enlarge characters sequentially along a direction in which the swiping gesture is made. If a swiping gesture made clockwise is detected as shown in FIG. 8A, the controller 400 may control the display unit 34 to sequentially enlarge characters clockwise from the character G.

Figure 9B:
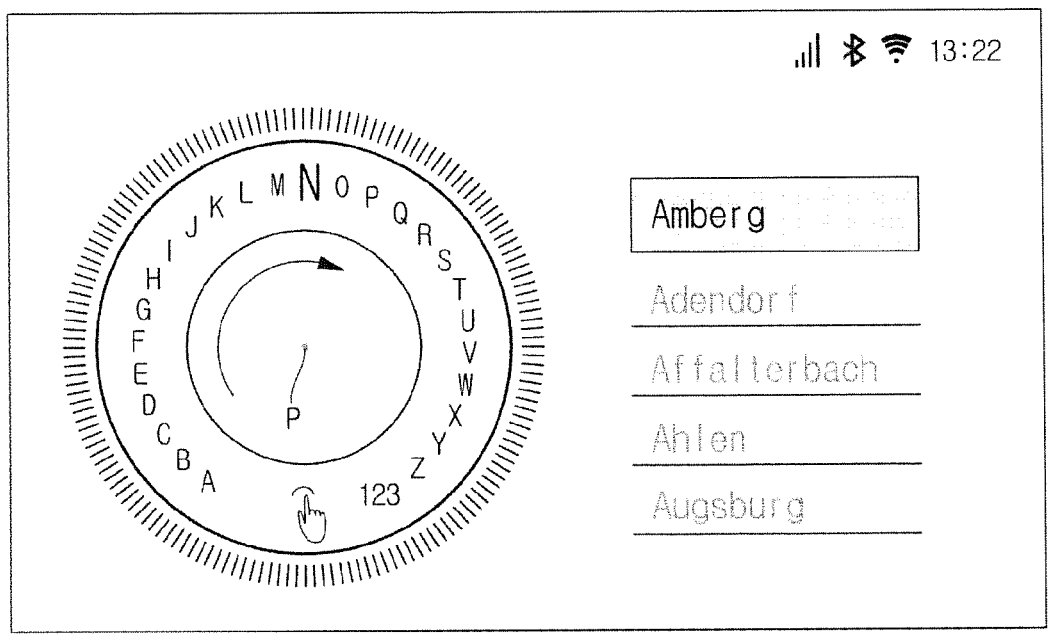

The passenger may visually check the characters that are sequentially enlarged to correspond to the swiping gesture, through the display unit 34, and stop swiping when a character he/she wants to select is enlarged. That is, the controller 400 may control the display unit 34 to enlarge a character the passenger wants to select, at a first location at which a finger moved from the second location of the first area S1 moves no longer. In FIG. 9B, a case in which a character the passenger wants to select is "N" is shown.

Then, as shown in FIG. 8B, the passenger may make a gesture of moving his/her finger from the first location of the first area S1 at which swiping is stopped to the second area S2. The gesture may correspond to a command for selecting the character corresponding to the first location.

Figure 9C:
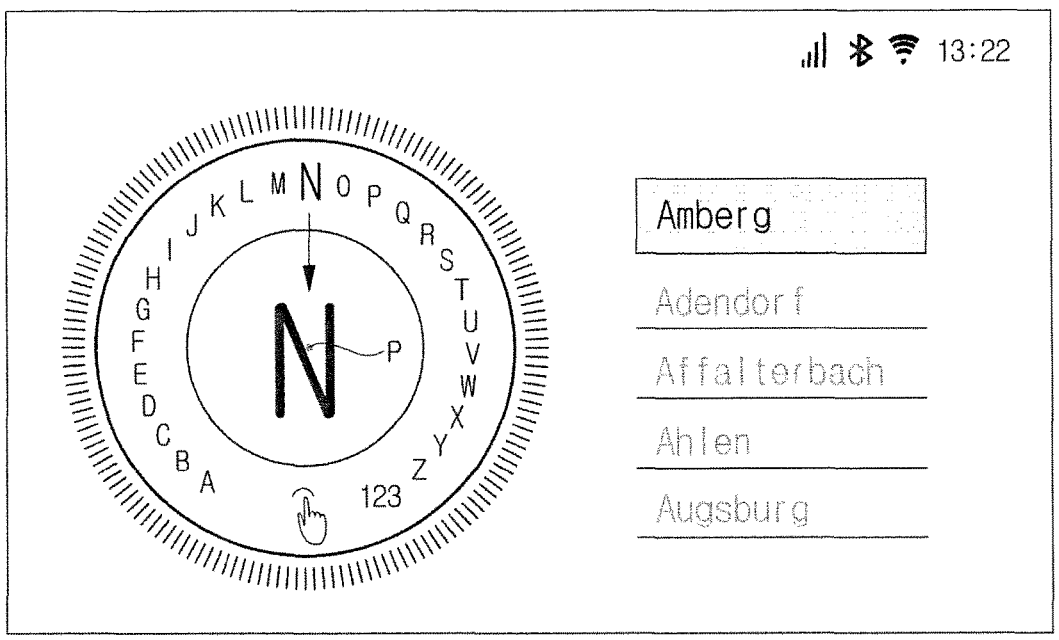

As a result, the controller 400 may control the display unit 34 to inform that the character corresponding to the first location was selected. Referring to FIG. 9C, the display unit 34 may display the selected character N in a central area surrounded by a character arrangement configured with a plurality of characters, thereby informing the passenger that the character N was selected.

Meanwhile, if a gesture of moving the finger to the first area S1 is detected following the gesture of moving the finger from the first location to the second area S2, the controller 400 may control the display unit 34 to inform that the selected character was cancelled. For example, as shown in FIG. 9C, if a selection cancellation gesture is detected after it is informed that the character N was selected, the display unit 34 may no longer display the character N displayed in the central area surrounded by the character arrangement.

So far, a case in which when a gesture of moving a finger from the first location of the first area S1 to the second area S2 is detected, the display unit 34 informs that a character corresponding to the first location was selected has been described.

However, if the touch input apparatus 200 is configured to sense pressure applied when a touch gesture is made, through the concave area, the first character input UI may be manipulated according to the touch gesture and the sensed result of the pressure.

For example, when pressure is sensed at the first location, and then a gesture of moving a finger from the first location to the second area S2 is detected, the controller 400 may recognize the detected gesture as a character selection command. Accordingly, when pressure is sensed at the first location, and then a gesture of moving a finger from the first location to the second area S2 is detected, the display unit 34 may inform that a character corresponding to the first location was selected.

When a gesture of moving a finger from the first location to the second area S2 is detected, and then pressure is sensed at the second area S2, the controller 400 may recognize the detected gesture as a character selection command. Accordingly, when a gesture of moving a finger from the first location to the second area S2 is detected, and then pressure is sensed at the second area S2, the display unit 34 may inform that a character corresponding to the first location was selected.

Also, when pressure is sensed at the first location, a gesture of moving a finger from the first location to the second area S2 is detected, and then pressure is sensed at the second area S2, the controller 400 may recognize the detected gesture as a character selection command. Accordingly, when pressure is sensed at the first location, a gesture of moving his/her finger from the first location to the second area S3 is detected, and then, pressure is sensed at the second area S2, the display unit 34 may inform that a character corresponding to the first location was selected.

Meanwhile, as shown in FIG. 4, if an input character combination configured with characters input sequentially is "Amberg", the first character input UI may display completed character combinations "Adendorf", "Affalterbach", "Ahlen", and "Augburg" corresponding to the input character combination "Amberg", together with the input character combination "Amberg".

Then, the controller 400 may determine whether the number of pre-stored completed character combinations corresponding to the input character combination configured with at least one character selected sequentially by a touch gesture detected by the touch input apparatus 200 is smaller than or equal to a threshold value. Herein, the threshold value may correspond to the maximum number of completed character combinations which is enough to display a second character input UI which will be described below, and the threshold value may have been decided when the vehicle 1 (see FIG. 1) is manufactured, or may be decided by a passenger's input.

If the number of the pre-stored completed character combinations corresponding to the input character combination is smaller than or equal to the threshold value, the controller 400 may control the display unit 34 to display a second character input UI in which the completed character combinations corresponding to the input character combination are arranged in the form of a circle or oval.

Figure 10:
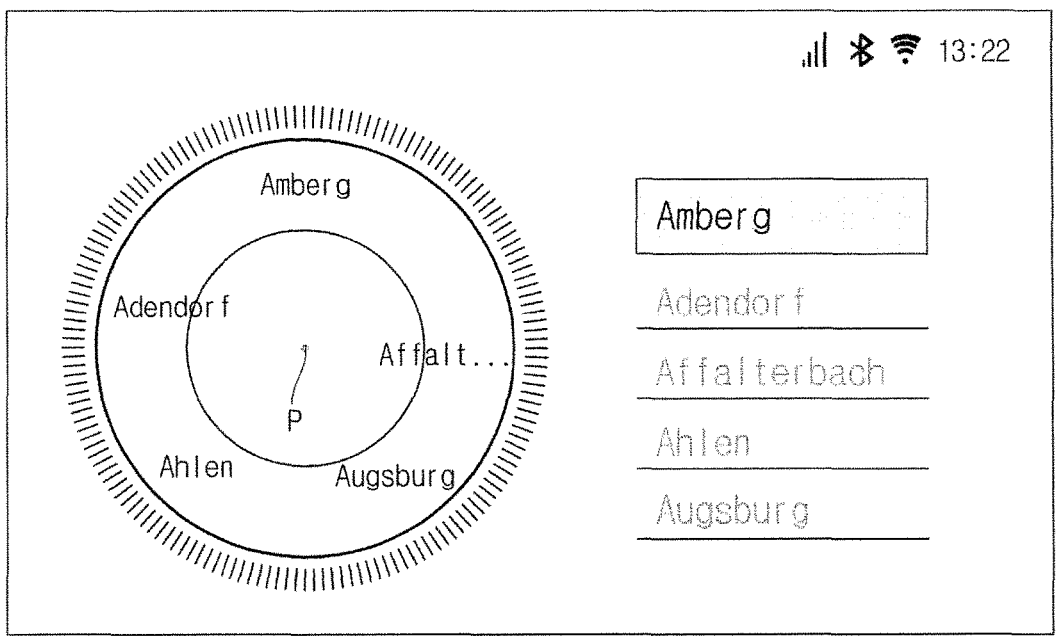
FIG. 10 shows an embodiment of a second character input UI displayed on a display unit.

FIG. 10 shows an embodiment of a second character input UI displayed on the display unit 34.

In FIG. 10, a second character input UI in which an input character combination "Amberg", and completed character combinations "Adendorf", "affalterbach", "Ahlen", and "Augburg" corresponding to the input character combination "Amberg" are arranged to surround a predetermined reference point P is shown.

A passenger may visually check the second character input UI, and then make a gesture of selecting any one of the arranged completed character combinations on the touch input apparatus 200.

A gesture of selecting a completed character combination with respect to the second character input UI may be the same as a gesture of selecting a completed character combination with respect to the first character input UI, and a gesture of cancelling a selection of a completed character combination with respect to the second character input UI may also be the same as a gesture of cancelling a selection of a completed character combination with respect to the first character input UI. Accordingly, detailed descriptions thereof will be omitted.

If the gesture of selecting the completed character combination is detected, the controller 400 may search for information corresponding to the selected completed character combination in the storage, and control the vehicle 1 based on the found information. Simultaneously, the controller 400 may control the display unit 34 to inform that the completed character combination was selected. For example, the display unit 34 may display the selected completed character combination in a central area surrounded by the plurality of completed character combinations, thereby informing the passenger that the displayed completed character combination was selected.

As such, by displaying the second character input UI, the passenger can select a completed character combination without having to input all characters individually.

FIG. 11 is a flowchart illustrating a vehicle control method according to an embodiment of the present disclosure.

Referring to FIGS. 2 and 11, the display unit 34 may display a first character input UI in which a plurality of characters are arranged to surround a reference point, in operation 700. The characters arranged in the first character input UI may include at least one of consonants, vowels, and special characters of a predetermined language. Since the plurality of characters is arranged in this way, a passenger can easily manipulate the first character input UI through the concave area of the touch input apparatus 100 or 200.

Then, the touch input apparatus 100 or 200 may determine whether a gesture of selecting a character is detected, in operation 710. More specifically, the touch input apparatus 100 or 200 may determine whether a gesture of moving a finger from a first location of a first area S1 of the concave area to a second area S2 is detected.

The second area S2 may be a circular area in the center of a touch section which is a concave area, and the first area S1 may be a border area surrounding the circumference of the second area S2. The first location may be a location at which a touch input of causing a character a passenger wants to select among the plurality of characters to be in a selectable state can be detected.

If no gesture of selecting a character is detected, the touch input apparatus 100 or 200 may continue to determine whether a gesture of selecting a character is detected.

Meanwhile, if a gesture of selecting a character is detected, the display unit 34 may display the selected character, in operation 720. If there is another character selected earlier than the currently selected character, the currently selected character may be displayed following the previously selected character.

Then, the controller may determine whether the number of completed character combinations corresponding to an input character combination configured with the sequentially selected characters is smaller than or equal to a threshold value, in operation 730. Herein, the threshold value may correspond to the maximum number of completed character combinations which is enough to display a second character input UI which will be described below, and the threshold value may have been decided when the vehicle 1 (see FIG. 1) is manufactured, or may be decided by a passenger's input.

If the controller determines that the number of the completed character combinations corresponding to the input character combination is greater than the threshold value, the vehicle 1 may return to operation 710 to determine whether a gesture of selecting a character is detected.

Meanwhile, if the controller determines that the number of the completed character combinations corresponding to the input character combination is smaller than or equal to the threshold value, the display unit 34 may display a second character input UI in which the completed character combinations corresponding to the input character combination are arranged to surround a reference point, in operation 740.

The completed character combinations arranged in the second character input UI may be completed character combinations including the entirety of the input character combination, or completed character combinations including at least one of a plurality of characters configuring the input character combination.

Then, the touch input apparatus 100 or 200 may determine whether a gesture of selecting a completed character combination from among the completed character combinations is detected, in operation 750. More specifically, the touch input apparatus 100 or 200 may determine whether a gesture of moving a finger from a third location of the first area S1 of the concave area to the second area S2 is detected.

The third location may be a location at which a touch input of causing a completed character combination a passenger wants to select among the plurality of completed character combinations to be in a selectable state can be detected.

If no gesture of selecting a completed character combination is detected, the touch input apparatus 100 or 200 may continue to determine whether a gesture of selecting a completed character combination is detected.

Meanwhile, if a gesture of selecting a completed character combination is detected, the display unit 34 may display the selected completed character combination, in operation 760.

According to the vehicle and the control method thereof as described above, by displaying a character input UI to show pre-stored completed character combinations corresponding to an input character combination configured with input characters, it is possible to provide a passenger with an environment in which he/she can easily input characters.

As a result, it is possible to reduce a time taken to input characters and to reduce vehicle operating load, which leads to an improvement of driving safety.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A vehicle comprising:
   a display for displaying a first character input User Interface (UI) in which a plurality of characters are arranged to surround a predetermined reference point;
   a touch input apparatus having a concave area for detecting a touch gesture of selecting one character of the plurality of characters; and a controller for controlling the display to display, if the number of pre-stored completed character combinations corresponding to an input character combination configured with at least one character sequentially selected according to the touch gesture detected by the touch input apparatus is smaller than or equal to a threshold value, a second character input UI in which the completed character combinations corresponding to the input character combination are arranged to surround the reference point, wherein the concave area is divided into a first area and a second area, wherein the second area corresponds to a central part of the concave area and has a circular shape, and the first area surrounds a circumference of the second area, and wherein, when the touch input apparatus detects a gesture of moving a touch location from the first area to the second area, the controller controls the display to display that a character or a completed character combination corresponding to the touch location of the first area is selected.

2. The vehicle according to claim 1, wherein the touch input apparatus detects a touch gesture of selecting a completed character combination from among the arranged completed character combinations.

3. The vehicle according to claim 2, wherein the controller controls the display to inform that the selected completed character combination was selected.

4. The vehicle according to claim 1, wherein if the gesture of moving the touch location from the first area to the second area is detected, and successively, a gesture of moving the touch location to the first area is detected, the controller controls the display to inform that the selection of the selected character or the selected completed character combination was cancelled.

5. The vehicle according to claim 1, wherein, if the number of completed character combinations including the entirety of the input character combination is smaller than or equal to the threshold value, the controller controls the display to display the second character input UI.

6. The vehicle according to claim 1, wherein if the number of completed character combinations including at least one character of characters configuring the input character combination is smaller than or equal to the threshold value, the controller controls the display to display the second character input UI.

7. The vehicle according to claim 1, wherein the controller controls the display to display a second character input UI in which the completed character combinations corresponding to the input character combination are adjusted to have a predetermined length.

8. The vehicle according to claim 7, wherein the controller reduces the sizes of the completed character combinations so that the completed character combinations have the predetermined length.

9. The vehicle according to claim 7, wherein the controller omits at least one character of characters configuring each completed character combination so that the completed character combinations have the predetermined length.

10. A method of controlling a vehicle, the vehicle including a touch input apparatus having a concave area configured to detect a touch gesture, comprising:

displaying a first character input User Interface (UI) in which a plurality of characters are arranged to surround a predetermined reference point on a display;

detecting, by the touch input apparatus, a touch gesture of selecting a character of the plurality of characters; and displaying, if the number of pre-stored completed character combinations corresponding to an input character combination configured with at least one character sequentially selected according to the touch gesture detected by the touch input apparatus is smaller than or equal to a threshold value, a second character input UI in which the completed character combinations corresponding to the input character combination are arranged to surround the reference point on the display, wherein the concave area is divided into a first area and a second area, and wherein the second area corresponds to a central part of the concave area and has a circular shape, and the first area surrounds a circumference of the second area, wherein the detecting of the touch gesture comprises, when a touch gesture of moving a touch location from the first area to the second area is detected, informing that the selection of the selected character was cancelled.

11. The method according to claim 10, further comprising:

detecting a touch gesture of selecting a completed character combination from among the arranged completed character combinations; and informing that the selected completed character combination was selected.

12. The method according to claim 10, further comprising if the gesture of moving the touch location from the touch location of the first area to the second area is detected, and successively, a gesture of moving the touch location to the first area is detected, informing that the selection of the selected character was cancelled.

13. The method according to claim 10, further comprising if a gesture of moving a touch location from the first area to the second area is detected when the second character input UI is displayed, informing that a completed character combination corresponding to the touch location of the first area was selected.

14. The method according to claim 13, further comprising if the gesture of moving the touch location from the first area to the second area is detected, and successively a gesture of moving the touch location to the first area is detected, informing that the selection of the selected completed character combination was cancelled.

15. The method according to claim 10, wherein the displaying of the second character input UI comprises displaying the second character input UI, if the number of completed character combinations including the entirety of the input character combination is smaller than or equal to the threshold value.

16. The method according to claim 10, wherein the displaying of the second character input UI comprises displaying the second character input UI, if the number of completed character combinations including at least one character of characters configuring the input character combination is smaller than or equal to the threshold value.

17. The method according to claim 10, wherein the displaying of the second character input UI comprises displaying a second character input UI in which the completed character combinations corresponding to the input character combination are adjusted to have a predetermined length.

18. The method according to claim 17, wherein the displaying of the second character input UI comprises reducing the sizes of the completed character combinations so that the completed character combinations have the predetermined length.

19. The method according to claim 17, wherein the displaying of the second character input UI comprises omitting at least one character of characters configuring each completed character combination so that the completed character combinations have the predetermined length.

\* \* \* \* \*